April 21, 1931.  G. E. FELDMAN  1,801,307
IMMERSION HEATER
Filed June 15 1928
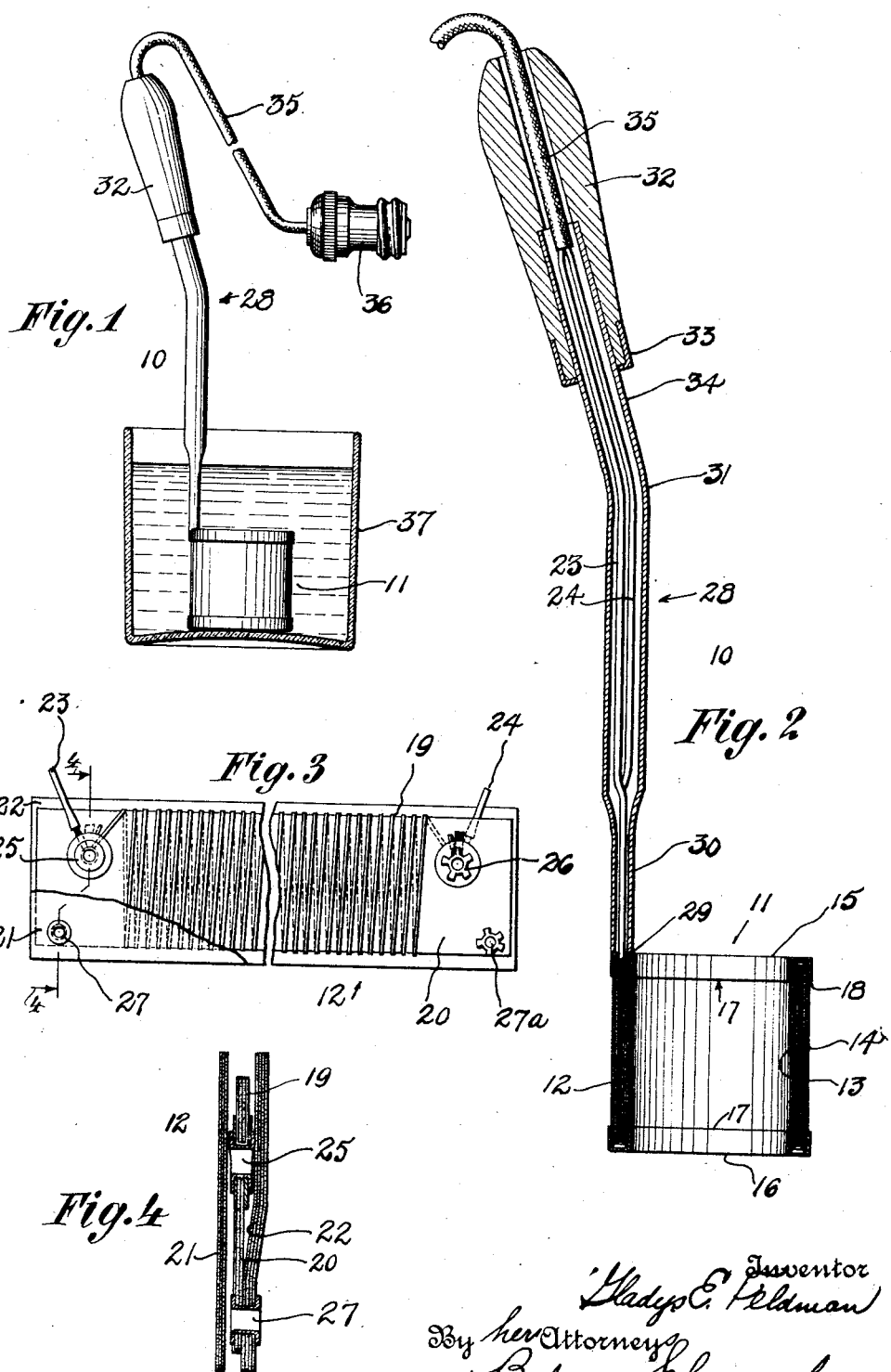

Patented Apr. 21, 1931

1,801,307

UNITED STATES PATENT OFFICE

GLADYS E. FELDMAN, OF NEW YORK, N. Y.

IMMERSION HEATER

Application filed June 15, 1928. Serial No. 285,551.

This invention relates to immersion heaters, and has among its objects the provision of an improved device of the character described which is of improved construction to impart heat for maximum efficiency to a liquid wherein it is immersed.

Another object of the invention is to provide a device of the nature set forth having a heating member of improved circular or ring form to expose a considerable area for contact with the liquid that is being heated and to permit a rapid and efficient circulation of the liquid through and about the said member.

A further object of the invention is to provide a device of the type mentioned which is of a form similar to that of a liquid container into which it is placed for efficiently imparting heat to the liquid.

Still another object of the invention is to construct a device of the class alluded to having a handle permitting easy and convenient manipulation of the device and which device is fluid tight to prevent entrance of the liquid thereinto.

Other objects and advantages of the invention will become apparent as the specification proceeds.

With the aforesaid objects in view, the invention consists in the novel combinations and arrangements of parts hereinafter described in their preferred embodiments, pointed out in the subjoined claim, and illustrated on the annexed drawing, wherein like parts are designated by the same reference characters throughout the several views.

In the drawing:

Figure 1 is a view in elevation of an embodiment of the invention showing a typical use thereof.

Fig. 2 is an enlarged vertical section of the immersion heater.

Fig. 3 is a detail view of the heating coil with certain parts removed.

Fig. 4 is a vertical section taken on the line 4—4 of Fig. 3.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Generally described, the invention provides an electric immersion heater which is adapted to be inserted into a liquid container to rapidly and efficiently heat the liquid therein. For this purpose the device includes a heating element of ring form, the sides of the ring being comparatively flat and thin. To insure ample heating surface the ring is of considerable width and it is liquid tight to properly enclose an electrical heating coil therein. A handle of tubular form communicates with the heating element and extends in the direction of the axis thereof. The conductors for connecting the resistance into an electrical circuit pass through the tubular handle and terminate at their ends in a plug that may be screwed into any house socket as may be desired.

Referring in detail to the drawing, 10 denotes a device embodying the invention. The same includes a tubular member 11 which is of ring form and wherein is housed an electrical heating coil 12. The member 11 may be of rectangular form in cross section and is comparatively thin as shown. It may, as to specific details of construction, be made in various ways, but for the purpose of this invention, I may show the same as consisting of inner and outer rings of metal 13 and 14 which are of cylindrical form and of a fairly considerable height. The members 13 and 14 may be secured together at their ends as, for example, by soldering. Engaging together the edges of the members to form the enclosure are upper and lower rims 15 and 16 which are of U-form in cross section and take over the members 13 and 14 to which they may be soldered along the edges 17 and 18.

The heating coil 12 consists of a wire 19 which has a proper melting point. It is wound upon a non-conductor 20 which may be made of mica. To insulate the heating coil from the casing 11 insulation strips 21 and 22 may be employed at the inner and outer sides of the heating coil. Conductor wires 23 and 24 may be connected to the heating coil in any suitable manner and preferably by means of eyelets 25 and 26. The latter are fastened to the insulating members 20 so as to form a reliable anchorage for the ends of both the heating coil 19 and the conductor wires 23, 24. To retain the heating coil in proper vertically centered position, fasteners 27 and 27a which may be in the form of eyelets pass through the insulation 20 and through the members 21 and 22 respectively as shown in Fig. 4, thus preventing the heating coil from dropping to the bottom of the casing 11.

A handle 28 is fastened to the casing 11 and extends in an upright direction therefrom and in substantial parallelism with the axis of the said casing. Preferably the said handle is of tubular form and communicates with the interior of the casing, being secured thereto in a fluid tight manner as, for example, by soldering at 29. For effecting a neat joint, the lower portion of the said handle is preferably flattened at 30 to a thickness substantially equal to that of the ring whereto it is connected. The leads 23, 24 extend through the handle 28 and the shank of the latter may be bent at 31 to facilitate the handling of the device. At the upper end of the handle 28 is positioned a member 32 which forms a handle proper for the device and is made of a material of low heat conductivity, as for example, wood. A sleeve 33 is formed at the lower end of the member 32 and snugly engages the shank 34 so as to form a tight engagement therewith. The member 32 is bored centrally throughout to permit the conductors 23, 24 which terminate in an insulated unitary lead 35 to pass outward therefrom into engagement with a plug 36 of conventional type to permit the device to be connected to the house circuit.

It will be appreciated that owing to the construction of the heating member or casing 11, a relatively considerable area is provided at which heat may be transmitted to the liquid into which the device is immersed and that the heating surface may be properly distributed throughout the liquid. As may be seen in Fig. 1, the heating element 11 may be placed in symmetrical relation with the sides of the liquid container 37. There is thus provided freedom for the circulation of the liquid uniformly about the heating element and also interiorly thereof. As a consequence, the heating action may proceed with a high degree of rapidity.

Furthermore, the construction of the heating element herein shown possesses neatness and uniformity of appearance as a result particularly of the ring formation of the same. It may be readily inspected and thoroughly cleaned at all times. Since it will in normal operation be totally submerged and at a considerable depth below the surface of the liquid, the currents generated in the latter will tend to flow upwardly, while the cooler portion of the liquid is displaced downwardly to be heated by the device.

It is thus seen that I have provided a device which fulfills the several objects of this invention and will meet the conditions of practical use.

I claim:

A liquid immersion heater comprising a flat tube of ring form, said tube being comparatively thin and being of considerable width, a heating coil in the tube, an insulation strip on which the heating coil is wound, conductors to connect said coil into an electrical circuit, and a handle of tubular form having liquid tight communication with the said tube, said handle extending substantially in the direction of the axis of the said tube, said handle enclosing said conductors, strips of insulation on both sides of the heating coil, and metallic fastening means securing all the strips together into a unit, said fastening means constituting terminals for the heating coil and conductors.

In testimony whereof I affix my signature.

GLADYS E. FELDMAN.